United States Patent Office 3,027,387
Patented Mar. 27, 1962

3,027,387
POLYGLYCOL ETHER DERIVATIVES
Otto Albrecht, Neuewelt, Switzerland, assignor to Ciba Limited, Basel, Switzerland, a Swiss firm
No Drawing. Filed June 18, 1959, Ser. No. 821,076
Claims priority, application Switzerland July 15, 1955
9 Claims. (Cl. 260—404.5)

The present application is a continuation-in-part of my application Serial No. 596,444, filed July 9, 1956, and now abandoned.

This invention provides new polyglycol ether derivatives corresponding to the general formula (1)
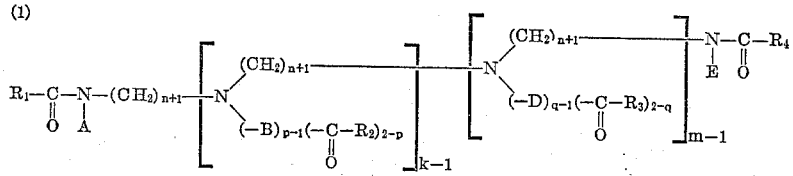

wherein $n$, $p$, $q$, $k$, and $m$ each represent an integer from 1 to 2, $R_1$, $R_2$, $R_3$ and $R_4$ each represent a saturated aliphatic straight-chain hydrocarbon radical containing 1 to 17 carbon atoms, at least two of said hydrocarbon radicals containing 11 to 17 carbon atoms each, A represents the radical $(CH_2CH_2-O-)_vH$, B represents the radical $(CH_2CH_2-O-)_xH$, D represents the radical $(CH_2CH_2-O-)_yH$ and E the radical $$(CH_2CH_2-O-)_zH$$

$v$, $x$, $y$, and $z$ are each an integer and the sum of $v+x+y+z$ is a number from 8 to 30.

More particularly the invention provide polyglycol ethers corresponding to the general formula (2)
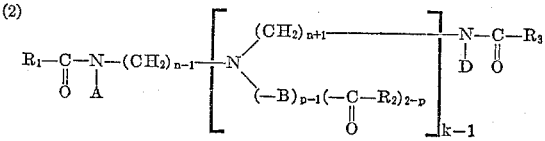

wherein $n$, $p$, $k$, $R_1$, $R_2$, $R_3$, A, B and D have the same meaning as given above.

Still more particularly the invention provides compounds derived from diethylene triamine and corresponding to the formula (3)
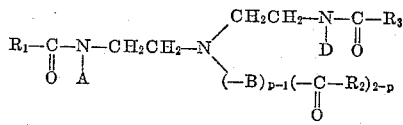

wherein $p$ represents an integer from 1 to 2, $R_1$, $R_2$ and $R_3$ each represent a saturated aliphatic straight-chain hydrocarbon radical containing 1 to 17 carbon atoms, at least two of the said hydrocarbon radicals containing 11 to 17 carbon atoms each, A represents the radical $(CH_2CH_2-O-)_xH$, B represents the radical $$(CH_2CH_2-O-)_yH$$

and D the radical $(CH_2CH_2-O-)_zH$, $x$, $y$ and $z$ are each an integer and the sum of $x+y+z$ is a number from 8 to 30.

The preferred products of the invention are those of the Formula 3 especially when $p=1$, i.e. neutral derivatives from diethylene triamine in which each nitrogen atom is acylated.

The aforesaid polyglycol ether derivative can be made by reaction of 8–30 mols of ethylene oxide with 1 mol of an N-acylated alkylene polyamine which contains 2 to 4 nitrogen atoms separated from each other by alkylene groups containing 2 to 3 carbon atoms, in which N-acylated alkylene polyamine at least 2 nitrogen atoms are acylated by a saturated aliphatic straight-chain monocarboxylic acid containing 12 to 18 carbon atoms. As a rule there are obtained no unitary ethylene oxide addition products; but the reaction with ethylene oxide yields mixtures of slightly different hydroxyethylated compounds. Therefore, for example, by reaction of 12 mols of ethylene oxide with 1 mol of a diacyl diethylene triamine an average of 12 $-CH_2-CH_2-O-$ groups are introduced and it can not definitely be said that the addition product has the formula

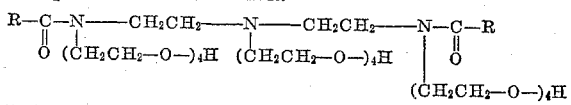

It is quite possible that one nitrogen atom is substituted by a $-(CH_2CH_2-O-)_6H$ group and another by a $-(CH_2CH_2-O-)_2H$ group. In any case each hydrogen atom of the acylamine attached at a nitrogen atom is substituted by at least one $-CH_2CH_2OH$ group and the molecule contains an average of 8 to 30 $-CH_2CH_2-O-$ groups.

The acyl-compounds used as starting materials are derived from aliphatic alkylene polyamines which contain 2 to 4 nitrogen atoms separated from each other by at least one divalent alkylene group containing 2 to 3 carbon atoms, preferably by at least one ethylene group, for example, from ethylene diamine, propylene diamine, diethylene triamine or triethylene tetramine. Especially advantageous are the acyl compounds of diethylene triamine.

The acyl radicals of the compounds of the Formulae 1, 2 and 3 may contain from 2 to 22, preferably from 12 to 18, carbon atoms. Accordingly, the acyl radicals are derived, for example, from advantageously unbranched saturated fatty acids of high molecular weight, such as lauric acid (for example, in the form of coconut oil fatty acid), myristic acid, palmitic acid, arachic acid or behenic acid. Especially advantageous are, for example, acyl compounds derived from stearic acid, and especially those of which the acyl radicals are those of so-called commercial stearic acid consisting for the greater part of stearic acid. If the acyl radicals are derived from fatty acids of low molecular weight they consist, for example, of an acetyl, propionyl or butyryl radical.

The acyl-compounds used as starting materials for making the polyglycol ether derivatives can be prepared from the appropriate polyamines and carboxylic acids, or, if desired, functional derivatives of these acids, such as their acid halides, especially their acid chlorides, or acid anhydrides. When acyl radicals of low molecular weight are introduced in addition to acyl radicals of high molecular weight, it is of advantage to introduce the former acyl radicals last.

The number of acyl radicals introduced in the amine depends especially on the molecular proportions of the amine and of the functional derivatives of the fatty acids. By reacting, for example, 1 mol of diethylene triamine with 2 mols of a fatty acid two, preferably the two primary, nitrogen atoms are acylated. When 1 mol of diethylene triamine is reatced with 3 mols of a fatty acid the preponderant amount of the reaction product corresponds to a product in which each nitrogen atom is acylated.

The acylamino-compounds are reacted with ethylene oxide advantageously at a raised temperature with the exclusion of atmospheric oxygen and preferably in the presence of a suitable catalyst, for example, a small quantity of an alkali metal or alkali metal hydroxide, carbonate or acetate.

The amount of additively combined ethylene oxide is critical. Useful products are obtained when 1 mol of the acylamino-compound is reacted with about 8–30, more specifically with 10–25, and most advantageously about 15–20 mols of ethylene oxide. These products are particularly useful as softening agents for textile fibers. They possess good resistance to heat and have little or no yellowing affinity on the textile fibers treated therewith. When applied to dyed material, the fastness to light of the dyeing is usually not impaired at all or only to an inconsiderable extent. The polyglycol ether compounds are very suitable for incorporation in anti-creasing treatment baths, so as to impart to the treated material an anti-crease resistant dressing and also a soft feel. In many cases the products of the invention are also useful for shifting the dye equilibrium in a dyebath.

Those polyglycol ether derivatives of the invention which contain at least one basic nitrogen atom can be converted in known manner into salts, for example, acetates, or, if desired, into quaternary ammonium salts, and used in this form. The products of the invention may be used for softening synthetically produced or chemically modified cellulosic fibers or regenerated cellulosic fibers the manufacturing process of which has been completed. Synthetically produced fibers are those of polyacrylonitrile, polyesters, polyamides or polyurethanes; chemically modified cellulosic fibers are those of cellulose acetate or cellulose ether; and regenerated cellulosic fibers are those of rayon. Besides these synthetically produced or semi-synthetically produced fibers there come into consideration animal fibers, such as wool or silk and natural cellulosic fibers, such as cotton or linen. Especially good softening effects are obtained by treating fibers from polyacrylonitrile, polyamides, rayon and cellulose triacetate.

The aqueous treating bath contains the products of the invention in such an amount that the treated fibers may contain 0.08 to 1.2, preferably 0.1 to 1 or 0.15 to 0.8 percent of the product. The fibers may be treated with the bath in the usual exhaust process or by the padding process.

When, in the exhaust process, polyacrylonitrile, polyester, polyamide, or cellulose acetate fibers are to be treated, the bath contains 0.1–0.2 percent of the product; in the case of cotton it contains about 0.2–0.4; and in the case of wool fibers about 0.8–1.2 percent, calculated on the weight of the fibers.

The temperature of the treating bath may vary within wide limits, for example, between 20° C. and 100° C. As a rule, the fibers are treated at temperatures between 20 and 40° C. After the treating with the bath the fibers are dried, usually without previous rinsing, at temperatures ranging from 20 to 160° C., preferably at elevated temperatures i.e. at a temperature between 60 and 120° C.

The following examples illustrate the invention, the parts and percentages being by weight:

*Example 1*

103 parts (1 mol) of diethylene triamine are heated in a current of nitrogen to 140° C. under a descending condenser, and 540 parts (2 mols) of commercial stearic acid are added in the course of 4 hours. The mixture is stirred for a further 4 hours in a current of nitrogen at 160–165° C. One molecular proportion of the condensation product so obtained is then reacted with 25 molecular proportions of ethylene oxide at 110–130° C. in the presence of about 1 percent of sodium calculated on the acylation product. The polyglycol ether derivative is a soft mass which is easily soluble in water.

The acetate of the condensation product described above can be prepared by mixing 15 parts of the condensation product with 4.4 parts of acetic acid of 20 percent strength and 10.6 parts of water. In this manner there is obtained a paste having a calculated content of 50 percent of amine.

*Example 2*

92.7 parts (1 molecular proportion) of diethylene triamine and 729 parts (3 molecular proportions) of commercial stearic acid are heated in a current of nitrogen at 140° C., and then the mixture is first heated for 3 hours at 140 to 145° C. and thereafter for a further 4½ hours at 160–165° C. Nitrogen is continuously passed through the apparatus. There are obtained 776 parts of a pale wax-like condensation product.

60 parts (1 molecular proportion) of the reaction product so obtained are melted in a current of nitrogen, then 0.15 part of sodium is added, and ethylene oxide is introduced as a finely distributed gas stream at 150 to 160° C. until 92 parts (30 molecular proportions) of ethylene oxide have been taken up. The hydroxyethylation product so obtained is a light colored solid mass, which yields an opalescent solution when taken up in warm water.

*Example 3*

92.7 parts (1 molecular proportion) of diethylene triamine and 729 parts (3 molecular proportions) of commercial stearic acid are heated in a current of nitrogen to 140° C., and then the mixture is first heated for 3 hours at 140–145° C. and then for a further 4½ hours at 160–165° C. Nitrogen is continuously passed through the apparatus. There are obtained 776 parts of a pale wax-like condensation product.

60 parts (1 molecular proportion) of the reaction product so obtained are melted in a current of nitrogen, and then 0.15 part of sodium is added and ethylene oxide is introduced as a finely distributed gas stream at 150–160° C. until 46 parts (15 molecular proportions) of ethylene oxide have been taken up. In this manner the hydroxyethylation product is obtained in the form of a light colored solid mass which when taken up in warm water yield an opalescent solution.

*Example 4*

103 parts (1 mol) of diethylene triamine are heated to 140° C. in a current of nitrogen, and 540 parts (2 mols) of commercial stearic acid are added in small portions in the course of 4 hours. The whole is then stirred for a further 4 hours at 160–165° C. Throughout the reaction nitrogen is passed through the apparatus continuously in order to prevent discoloration as far as possible.

121.4 parts (1 molecular proportion) of the condensation product so obtained are melted in a boiling water bath and 22.4 parts (1 molecular proportion) of acetic anhydride are run in in the course of one hour. The whole is then stirred for 2 hours in a boiling water bath. The reaction product is then treated with a dilute solution of sodium carbonate, taken up in an organic solvent, and then freed from solvent.

20 parts (1 molecular proportion) of the acylation product so obtained are melted in a current of nitrogen, 0.2 part of metallic sodium is added, and ethylene oxide is introduced in a finely distributed gas stream at 160–170° C. until 13.5 parts (10 molecular proportions) of ethylene oxide have been absorbed. In another sample, 20 parts of the acylation product are reacted with 10.8 parts (8 molecular proportions) of ethylene oxide. The ethoxylation products are solid masses, which are almost clearly soluble in warm water.

*Example 5*

Diethylene triamine is diacylated in commercial stearic acid as described in the first paragraph of Example 1. 80 parts (1 molecular proportion) of the resulting distearyl-diethylene triamine (from commercial stearic acid) are melted in a current of nitrogen, and then 0.8 part of sodium is added and ethylene oxide is introduced as a finely distributed gas stream until 180 parts (18 molecular proportions) thereof have been taken up. The condensation product, which is a rather soft mass, is soluble in water.

*Example 6*

243 parts (3 molecular proportions) of commercial stearic acid are heated in a current of nitrogen until they melt, and 43.8 parts (1 molecular proportion) of triethylene tetramine are added to the melt having a temperature of about 110° C. The reaction mass is then heated at 140–145° C. for 3 hours, and then at 160–165° C. for 4½ hours with stirring. During this time nitrogen is passed through the apparatus.

100 parts (1 molecular proportion) of the condensation product so obtained are heated to 150° C. in a current of nitrogen, whereupon ethylene oxide is introduced as a finely distributed gas stream until 109.4 parts (22 molecular proportions) are taken up. The resulting polyglycol ether derivative is a wax-like mass which is soluble in water.

*Example 7*

74 parts of propylene diamine (1 mol) and 540 parts (2 mols) of commercial stearic acid are heated to 140° C. in a current of nitrogen, whereupon the reaction mass is heated first at 140–145° C. for 3 hours and then at 160–165° C. for 4 hours. During this time, nitrogen is passed through the apparatus. 60 parts (1 molecular proportion) of the reaction product so obtained are melted in a current of nitrogen, and 0.15 part of sodium added, and at 150–160° C. ethylene oxide is introduced as a finely distributed gas stream until 70 parts (15 molecular proportions) are taken up.

*Example 8*

Fibers mentioned in the table below are worked at a liquor ratio of 1:30 for 10–30 minutes at a temperature between 30–55° C. in a solution containing the indicated percentage of condensation product of Example 3, calculated on the weight of the fibers. The textile fibers are dried, without rinsing, at temperatures from 60–80° C.

| Fiber: | Percent softening agent |
|---|---|
| Polyacrylonitrile | 0.15 |
| Polyester | 0.15 |
| Polyamide | 0.15 |
| Cellulose-2½-acetate | 0.15 |
| Cellulose-tri-acetate | 0.15 |
| Rayon | 0.08 |
| Cotton | 0.3 |
| Wool | 1.2 |

Especially good softening results are obtained with fibers of cellulose-tri-acetate and also with fibers of polyacrylonitrile, polyamides and rayon.

What is claimed is:

1. New polyglycol ether derivatives corresponding to the general formula $$R_1-\underset{\underset{O}{\|}}{C}-N-(CH_2)_{n+1}-\underset{A}{|}N\left[\begin{array}{c}(CH_2)_{n+1}-\\(-B)_{p-1}(-\underset{\underset{O}{\|}}{C}-R_2)_{2-p}\end{array}\right]_{k-1}N\left[\begin{array}{c}(CH_2)_{n+1}-\\(-D)_{q-1}(-\underset{\underset{O}{\|}}{C}-R_3)_{2-q}\end{array}\right]_{m-1}\underset{E}{|}N-\underset{\underset{O}{\|}}{C}-R_4$$

wherein $n$, $p$, $q$, $k$ and $m$ each represent an integer from 1 to 2, $R_1$, $R_2$, $R_3$ and $R_4$ each represent a saturated aliphatic straight-chain hydrocarbon radical containing 1 to 17 carbon atoms, at least two of said hydrocarbon radicals containing 11 to 17 carbon atoms each, A represents the radical $(CH_2CH_2-O-)_vH$, B represents the radical $(CH_2CH_2-O-)_xH$, D represents the radical $(CH_2CH_2-O-)_yH$ and E the radical $$(CH_2CH_2-O-)_zH$$

$v$, $x$, $y$ and $z$ are each an integer and the sum of $v+x+y+z$ is a number from 10 to 25.

2. New polyglycol ether derivatives corresponding to the general formula $$R_1-\underset{\underset{O}{\|}}{C}-N-(CH_2)_{n-1}-\underset{A}{|}N\left[\begin{array}{c}(CH_2)_{n+1}-\\(-B)_{p-1}(-\underset{\underset{O}{\|}}{C}-R_2)_{2-p}\end{array}\right]_{k-1}N-\underset{\underset{O}{\|}}{C}-R_3\underset{D}{|}$$

wherein $n$, $p$ and $k$ each represent an integer from 1 to 2, $R_1$, $R_2$ and $R_3$ each represent a saturated straight-chain aliphatic hydrocarbon radical containing 1 to 17 carbon atoms, and at least two of said hydrocarbon radicals containing 11 to 17 carbon atoms each, A represents the radical $(CH_2CH_2-O-)_vH$, B represents the radical $(CH_2CH_2-O-)_xH$ and D represents the radical $(CH_2CH_2-O-)_yH$, $v$, $x$ and $y$ are each an integer and the sum of $v+x+y$ is a number from 10 to 25.

3. New polyglycol ether derivatives corresponding to the general formula $$R_1-\underset{\underset{O}{\|}}{C}-N-CH_2CH_2-N\underset{(-B)_{p-1}(-\underset{\underset{O}{\|}}{C}-R_2)_{2-p}}{\overset{CH_2CH_2-N-\underset{\underset{O}{\|}}{C}-R_3}{\diagup}}$$

wherein $p$ represents an integer from 1 to 2, $R_1$, $R_2$ and $R_3$ each represent a saturated straight-chain aliphatic hydrocarbon radical containing 1 to 17 carbon atoms, and at least two of said hydrocarbon radicals containing 11 to 17 carbon atoms each, A represents the radical $(CH_2CH_2-O-)_vH$, B represents the radical $$(CH_2CH_2-O-)_xH$$

and D represents the radical $(CH_2CH_2-O-)_yH$, $v$, $x$ and $y$ are each an integer and the sum of $v+x+y$ is a number from 10 to 25.

4. New polyglycol ether derivatives corresponding to the general formula $$R_1-\underset{\underset{O}{\|}}{C}-N-CH_2CH_2-N-CH_2CH_2-N-\underset{\underset{O}{\|}}{C}-R_2$$
$$\underset{(CH_2CH_2-O-)_vH}{|} \underset{(CH_2CH_2-O-)_xH}{|} \underset{(CH_2CH_2-O-)_yH}{|}$$

wherein $R_1$ and $R_2$ each represent a saturated aliphatic straight-chain hydrocarbon radical containing 11–17 carbon atoms, $v$, $x$ and $y$ are each an integer and the sum of $v+x+y$ is a number from 10 to 25.

5. New polyglycol ether derivatives corresponding to the general formula $$R_1-\underset{\underset{O}{\|}}{C}-N-CH_2CH_2-N-CH_2CH_2-N-\underset{\underset{O}{\|}}{C}-R_3$$
$$\underset{(CH_2CH_2-O-)_vH}{|} \underset{\underset{R_2}{|}}{C=O} \underset{(CH_2CH_2-O-)_xH}{|}$$

wherein $R_1$, $R_2$ and $R_3$ each represent a saturated aliphatic straight-chain hydrocarbon radical containing 11–17 carbon atoms, $v$ and $x$ are each an integer and the sum of $v+x$ is a number from 10 to 25.

6. New polyglycol ether derivatives corresponding to the general formula

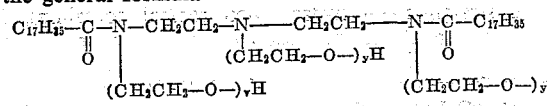

wherein $v$, $x$ and $y$ are each an integer and the sum of $v+x+y$ is a number from 10–25.

7. New polyglycol ether derivatives corresponding to the general formula

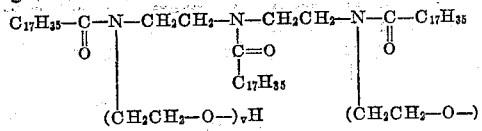

wherein $v$ and $x$ are each an integer and the sum of $v+x$ is a number from 10–25.

8. New polyglycol ether derivatives corresponding to the general formula

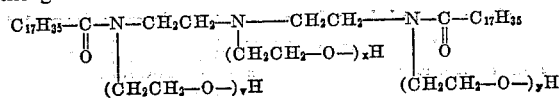

wherein $v$, $x$ and $y$ are each an integer and the sum of $v+x+y$ is about 15.

9. New polyglycol ether derivatives corresponding to the general formula

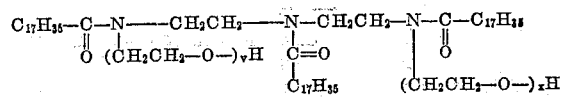

wherein $v$ and $x$ are each an integer and the sum of $v+x$ is about 15.

References Cited in the file of this patent
UNITED STATES PATENTS

| | | |
|---|---|---|
| 2,681,354 | Kelley et al. | June 15, 1954 |
| 2,901,430 | Chiddix et al. | Aug. 25, 1959 |

UNITED STATES PATENT OFFICE
CERTIFICATE OF CORRECTION

Patent No. 3,027,387            March 27, 1962

Otto Albrecht

It is hereby certified that error appears in the above numbered patent requiring correction and that the said Letters Patent should read as corrected below.

Column 1, line 35, for "provide" read -- provides --; column 3, line 3, for "reatced" read -- reacted --; column 7, lines 3 to 6, the formula should appear as shown below insted of as in the patent:

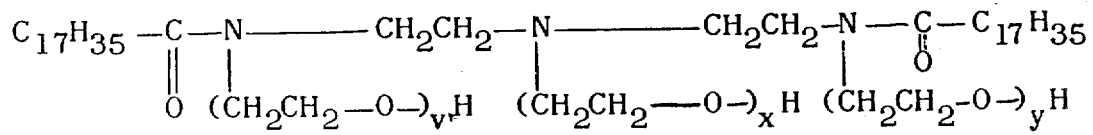

Signed and sealed this 27th day of November 1962.

(SEAL)
Attest:
ESTON G. JOHNSON
Attesting Officer

DAVID L. LADD
Commissioner of Patents